United States Patent [19]

Riikonen

[11] 3,846,763

[45] Nov. 5, 1974

[54] METHOD AND APPARATUS FOR AUTOMATIC SELECTION OF TRANSLATORS IN A DATA PROCESSING SYSTEM

[75] Inventor: Douglas L. Riikonen, Billerica, Mass.

[73] Assignee: Honeywell Information Systems, Inc., Waltham, Mass.

[22] Filed: Jan. 4, 1974

[21] Appl. No.: 430,838

[52] U.S. Cl. .............................................. 340/172.5
[51] Int. Cl. ............................ G06f 3/00, G06f 5/00
[58] Field of Search ................... 340/172.5, 347 DD

[56] References Cited

UNITED STATES PATENTS

| | | | |
|---|---|---|---|
| 3,568,160 | 3/1971 | Talarczyk | 340/172.5 |
| 3,676,858 | 7/1972 | Finch et al. | 340/172.5 |
| 3,754,217 | 8/1973 | Bell et al. | 340/172.5 |
| 3,781,808 | 12/1973 | Ahearn et al. | 340/172.5 |

*Primary Examiner*—Gareth D. Shaw
*Assistant Examiner*—Melvin B. Chapnick
*Attorney, Agent, or Firm*—Faith F. Driscoll; Ronald T. Reiling

[57] ABSTRACT

In a data processing system in which encoded data is transferred by a peripheral control unit between a central processing unit and one or more peripheral devices, method and apparatus for selecting and enabling one of a plurality of translators in the peripheral control unit to translate the encoded data from one code to another. Prior to transferring the encoded data between the central processing unit and the peripheral device, the central processing unit issues a command which contains an identification code word identifying the translator to be enabled. Each translator stores its own distinctive translator code word and each of these translator code words are successively compared with the identification code word until a match is obtained. When a match is obtained, the translator associated with the matching translator code word is enabled, and the encoded data is applied to the enabled translator for translation. In this manner, the peripheral control unit self-determines its translation capabilities and, for a given data transfer, enables the appropriate translator.

15 Claims, 4 Drawing Figures

METHOD AND APPARATUS FOR AUTOMATIC SELECTION OF TRANSLATORS IN A DATA PROCESSING SYSTEM

BACKGROUND OF THE INVENTION

This invention relates to data processing systems and more particularly to method and apparatus for automatic selection of translator apparatus used in data transfer operations.

A peripheral subsystem of a data processing system typically includes one or more peripheral devices for receiving or supplying data and a peripheral control unit for controlling the transfer of the data between the peripheral devices and a central processing unit (CPU). The CPU directs the operations performed by the peripheral control unit through commands contained in programs stored in and executed by the CPU. Commands are supplied to the peripheral control unit which processes the commands, carries out the indicated operations, and supplies appropriate status information to the CPU.

In the course of transferring data between the CPU and the peripheral devices, it may be necessary to translate the data from one code to another, for example, because the data has been or will be processed by another data processing system which uses a different code. Since a variety of codes are used in the data processing art, it is desirable that a peripheral control unit have the capability of translating from any one of such codes to any other of the codes.

In systems in current use, the translators which may be required for performing translations are hardwired into the peripheral control unit and the peripheral control unit logic is configured to respond to commands from the CPU, and in particular to identification information in such commands, by enabling the identified translator and then applying encoded data to such translator. In order to change the translation capability of such a peripheral control unit (i.e., to add translators to or remove translators from the peripheral control unit), hardware logic changes must be made in the unit to prevent the unit from attempting to enable a translator which has been removed and to permit the unit to enable the newly added translators when directed by a CPU command. In other words, the peripheral control unit logic must be modified so that the unit "knows" of the modified translation capability and of the location of any added translators. Such logic changes, of course, are time-consuming and costly.

SUMMARY OF THE INVENTION

It is an object of the present invention to provide a novel method and apparatus in a peripheral control unit for automatically identifying and selecting one of a plurality of translators to be used in a data transfer operation.

It is another object of the present invention to provide such a method and apparatus in which translators may be added to or removed from the peripheral control unit without the necessity of making a logic change in the peripheral control unit.

These and other objects of the present invention are illustrated in a specific embodiment in which a peripheral control unit includes a plurality of translators, each for translating encoded data from one code to another, a register for storing an identification code identifying a selected one of the translators, and apparatus for comparing the identification code stored in the register successively with translator code words, each of which is associated with and identifies a different translator. Upon the occurrence of a match between the identification code and a translator code word, the translator identified by the matching translator code word is enabled to perform translations.

In the above specific embodiment, translators may be removed from and added to the peripheral control unit without making any logic change in the unit because each translator is identified by its own translator code word. If, for example, a translator is added to the peripheral control unit, the added translator will be enabled just as any other translator when its translator code word is compared to and matches the identification code word.

BRIEF DESCRIPTION OF THE DRAWINGS

A complete understanding of the present invention and of the above and other objects and advantages thereof may be gained from a consideration of the following detailed description of a specific illustrative embodiment presented in connection with the accompanying drawings in which.

DESCRIPTION OF THE PREFERRED EMBODIMENT

Figure 1:
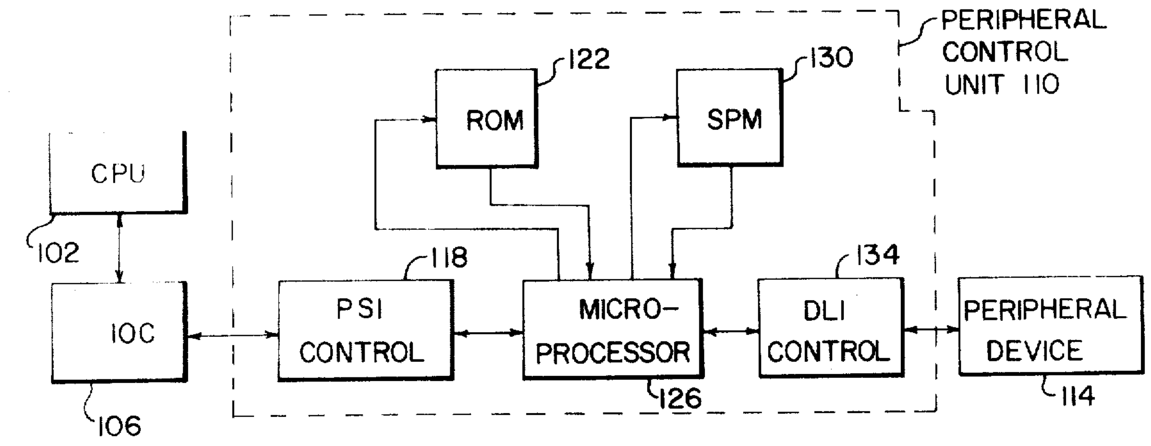
FIG. 1 shows a generalized peripheral subsystem coupled to a central processing unit of a data processing system.

Referring now to FIG. 1, there is shown an exemplary peripheral subsystem coupled via an input/output controller (IOC) 106 to a central processing unit (CPU) 102 of a data processing system. The peripheral subsystem includes one or more peripheral devices 114 and a peripheral control unit 110 coupled between the IOC 106 and the peripheral devices 114. The peripheral devices 114 illustratively could be magnetic tape units, magnetic disc files, and the like for recording and reproducing data. The data recorded on the peripheral devices 114 is supplied by the CPU 102 via the IOC 106 to the peripheral control unit 110. The peripheral control unit 110, in response to commands from the CPU 102 processes the data (translates the data, performs packing, etc.) and applies it to the appropriate one of the peripheral devices 114. Also, in response to commands from the CPU 102, the peripheral control unit 110 reads data from a designated one of the peripheral devices 114, processes the data (performs translation, depacking, etc.) and supplies the data to the IOC 106 and CPU 102.

For the sake of explanation, it should be understood that there could be additional peripheral subsystems similar to that of FIG. 1 coupled to the CPU 102. The different peripheral control units and corresponding peripheral devices may be referred to as logical channels and identified by logical channel numbers. That is, each logical channel identifies a particular peripheral control unit and associated peripheral device. Data transfer operations performed by a logical channel are specified by a channel program located in the CPU 102. Such a channel program is always associated with a particular logical channel and includes a complete set of instructions and addressing information for carrying out a data transfer operation.

The peripheral control unit 110 includes a peripheral subsystem interface (PSI) control coupled by data and control signal lines to the IOC 106, a microprocessor 126 coupled to the PSI control 118, a read only memory (ROM) 122 and scratch pad memory (SPM) 130, both coupled to the microprocessor 126, and a device level interface (DLI) 134 coupled to the microprocessor 126 and by data and control signal lines to the peripheral devices 114. The PSI control 118 includes logic and data storage for interfacing with the IOC 106. Illustratively, the PSI control 118 includes a register for temporarily storing commands and data transferred between the IOC 106 and the peripheral control unit 110, logic for controlling such transfers, and translators for translating data to be transferred to or received from the IOC 106 as well as logic for identifying and selecting the desired translator. If packing and unpacking of data is required, then the logic for doing this could be included in the PSI control 118.

The microprocessor 126 performs data processing operations necessary for effecting the transfer of data between the peripheral devices 114 and the CPU 102. These operations are specified by micro-instructions stored in the ROM 122. Specifically, the microprocessor 126 responds to commands received from the CPU 102 and reads (from the ROM 122) and executes the micro-instructions necessary to perform the operations specified by the command.

The SPM 130 provides temporary storage for commands received from the CPU 102, for data being transferred between the CPU 102 and the peripheral devices 114, and generally for any information or parameters used in carrying out a data transfer operation. The microprocessor 126 and ROM 122 might illustratively comprise a microprocessor and ROM such as described in IBM Maintenance Library Manual, No. SY3-2-5024-1 as part of the IBM 3803/3420 Magnetic Tape Subsystem. Scratch pad memories, of course, are well known in the art.

The DLI control 134 provides the logic and buffering necessary for interfacing with the peripheral devices 114. Illustratively, the DLI control 134 includes device drivers and receivers, device selector circuitry, a write buffer for temporarily storing the data to be applied to the devices, an index register and index counter for providing the timing or strobe signals for writing data into and reading data from the the peripheral devices, and possibly deskew circuitry (if the peripheral devices 114 are magnetic tape units) and error detecting circuitry.

An exemplary data transfer operation will now be described as it might illustratively be performed by the peripheral subsystem of FIG. 1.

Assuming that the peripheral control unit is powered up and has been initialized (registers reset, SPM 130 [at least portions thereof] cleared), a data transfer operation either to or from the peripheral devices 114 is initiated by the execution of a Connect instruction by the CPU 102. This instruction identifies, among other things, the channel program which is to define and control the data transfer operation. Execution of the Connect instruction involves determining the logical channel (peripheral control unit 110 and peripheral device) which is to taken part in the operation, and then determining if the logical channel is "available" for performing the data transfer operation. The logical channel will not be available if execution of another channel program associated with the logic channel has been started. If the logical channel is available, the channel program identified by the Connect instruction is placed in the initiation queue of the corresponding logical channel. This causes a control signal to be applied by the IOC 106 via the PSI control 118 to the microprocessor 126 indicating that a channel program is waiting to be initiated.

Upon receipt of the control signal indicating that a channel program is awaiting initiation, the microprocessor 126 issues an Initiate New Program service code to the IOC 106. This service code causes the IOC 106 to transfer to the microprocessor 126 a Set Function Mask command which includes the logical channel number (identifying the peripheral device which is to participate in the transaction) and the first entry (referred to as a channel command entry [CCE]) of the channel program.

From the logical channel number (which will have been stored in the SPM 130 by the microprocessor 126), the microprocessor identifies the specified peripheral device and causes the DLI control 134 to seize the device. The first CCE (which is also stored in the SPM 130) identifies the operation to be performed as a so-called Set Function Mask command operation.

To obtain the Function Mask from the IOC 106, the microprocessor 126 issues an Initiate Data Transfer service code to the IOC 106 after which the IOC transfers the Function Mask to the microprocessor 126. The Function Mask specifies, among other things, the mode of operation (transfer of data in bytes of 6 or 8 bits, whether packing or unpacking is to be utilized, etc.), density of the data to be stored or retrieved from the peripheral device and, if translation is to be performed, the type of translation required.

The microprocessor 126 verifies that the Function Mask defines a legitimate mode of operation (for example, by table look-up) and this verification includes application of a translator identification code word to the PSI control 118 to initiate a polling operation of the translators to verify that no translator is required or that the identified translator is installed. This operation will be described in greater detail later but suffice it to say that the PSI control 118 signals the microprocessor 126 of the results of the polling operation—a positive result is indicated if either no translator is required or the identified translator is installed and a negative result is indicated if the identified translator is not installed. In the latter case, the microprocessor 126 will abort the channel program since the data transfer cannot be properly completed without the required translator. If either no translator is required or the identified translator is installed, the microprocessor 126 performs a routine verifying that no errors have occurred in the operation performed thus far.

The microprocessor 126 then checks the Set Function Mask command, i.e., a particular bit in the command, to determine if additional commands are present in the channel program. Since, for a data transfer operation, more commands would be present, the microprocessor 126 causes the transfer of a Move Pointer service code to the IOC 106. In response the IOC 106 transfers the next command of the channel program. At this point in the channel program, any one of a variety of commands may be transfered such as Initialize device, Load tape, and various tape positioning commands (assuming that the selected peripheral device were a magnetic tape unit).

Assuming that all operations necessary to prepare the selected peripheral device for either storage or reproduction of data have been completed, a Write or Read command is then transferred from the IOC 106 to the microprocessor 126. If data is to be transferred from CPU 102 to the selected peripheral device, then a Write command would be transferred. In response to this command the microprocessor would issue an Initiate Data Transfer service code to the IOC 106. The microprocessor 126 would also again apply the translator identification code work to the PSI control 118 to enable the desired translator (or, if no translator were required, to enable circuitry which would allow transfer of data without the data being translated) and issue a command to the selected peripheral device to start the device (for example, begin movement of the magnetic tape unit). The data would then be applied to the PSI control 118, translated if translation were required, and applied to the microprocessor 126 for transfer to the selected peripheral device.

At the conclusion of the data transfer operation, a determination is made as to whether there are any more commands in the channel program and if not the channel program is terminated. This is accomplished by exchanging service codes and control signals between the IOC 106 and the peripheral control unit 110. Execution of a Read command is similar to execution of a Write command except, of course, data is transferred in the opposite direction.

Figure 2:
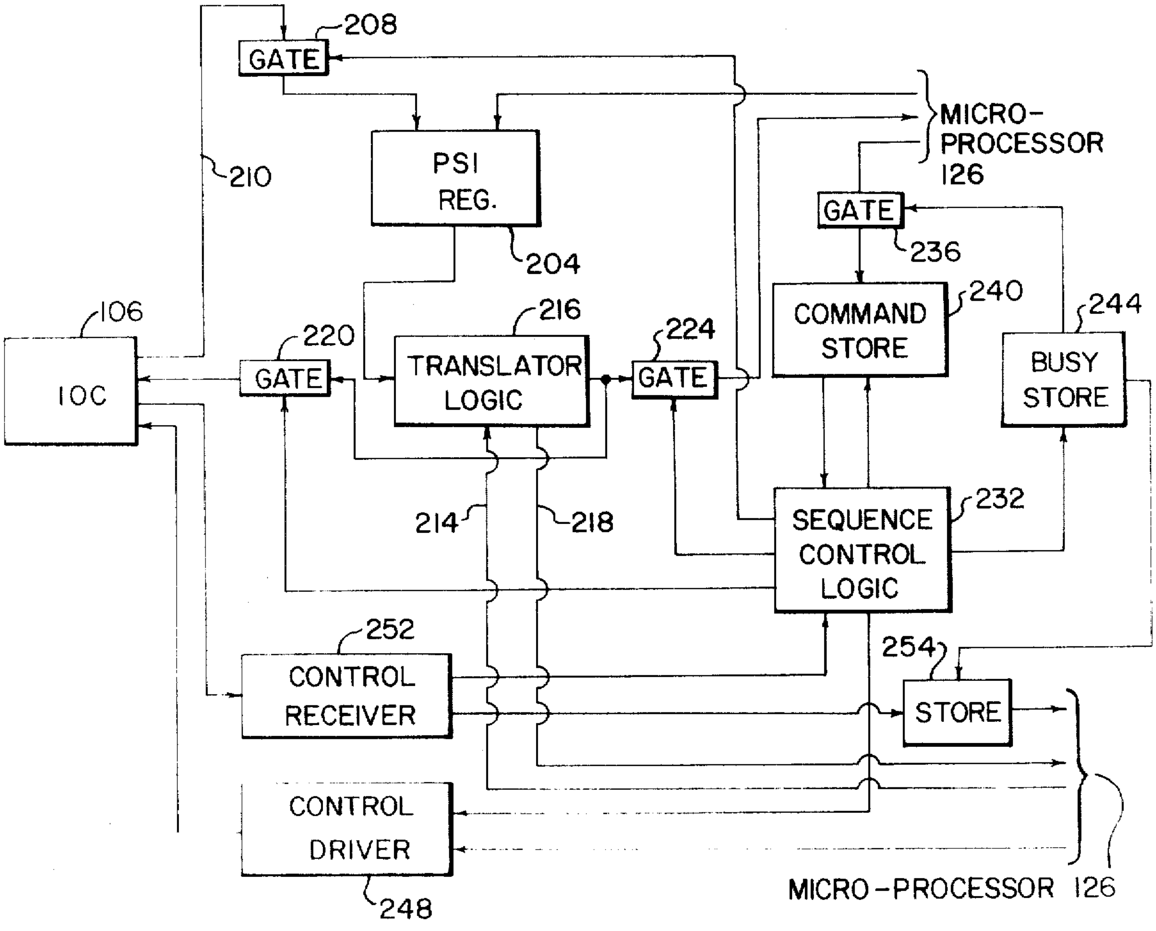
FIG. 2 shows a portion of the logic and circuitry of the peripheral subsystem interface control unit of FIG. 1 including a translator logic unit.

FIG. 2 shows detailed logic of the PSI control 118. This logic includes a PSI register 204 having two inputs, one from the microprocessor 126 and one from a gate 208 which is coupled via data lines 210 to the IOC 106. (Just as in FIG. 1, each line shown coupling elements together in FIG. 2 generally represents a plurality of lines over which data or control signals are transferred. Whether plural lines or a single line is represented will be apparent as FIG. 2 is described.) The output of the PSI register 204 is applied to translator logic 216 which includes a plurality of translators and circuitry for selectively enabling the translators. The translator logic 216 also includes circuitry which, when enabled allows passage of data through the translator logic without being translated. The output of the translator logic 216 is coupled to a gate 220 leading to the IOC 106 and to a gate 224 leading to the microprocessor 126. Each of the gates 208, 220 and 224 is controlled by a sequence control logic unit 232. That is, the sequence control logic unit 232 selectively enables the gates to cause the gates to pass any data present on the input lines of that gate. For example, when the gate 208 is enabled, any data on the lines 210 is passed to the PSI register 204.

All data which passes between the IOC 106 and the microprocessor 126 passes through the PSI register 204. The output of the PSI register is gated, under control of the sequence logic unit 232, to the appropriate destination.

The sequence control logic unit 232 responds to commands received from the microprocessor and applied via a gate 236 and stored in a command store 240. When a command is present in the command store 240, the sequence control logic 232 sets a busy indication in a busy store 244 to prevent further commands from being applied via the gate 236 to the command store 240.

In addition to controlling various gates and the busy store 244, the sequence control logic unit 232 applies control signals to a control driver 248 for application to the IOC 106. The microprocessor 126 also applies control signals to the control driver 248 for application to the IOC 106. The IOC 106, similarly, generates control signals which are applied to a control receiver 252 and then applied either to the sequence control logic unit 232 or to a temporary store 254 for sampling by the microprocessor 126. The condition of the busy store 244 is also stored in the temporary store 254 for sampling by the microprocessor 126.

The circuitry of FIG. 2 will now be briefly described for a Write operation, i.e., a data transfer from the IOC 106 to the microprocessor 126. Recall that when a channel program is waiting to be executed, the IOC 106 applies a control signal to the PSI control 118. This control signal is received by the control receiver 252 and applied to the temporary store 254. The microprocessor 126 detects the condition in the temporary store 254 and applies an Initiate New Program service code to the PSI register 204 and a command via the gate 236 to the command store 240. This assumes, of course, that no command is presently in the command store 240 so that the gate 236 is enabled by the busy store 244. In response to the command in the command store 240, the sequence control logic unit 232 signals the busy store 244 to disable the gate 236 (and also to set a condition in the temporary store 254) and then applies an enabling signal to the gate 220 to pass the Initiate New Program service code from the PSI register 204 via the translator logic 216 to the IOC 106. (At this stage, the translator logic is in the reset condition so that the service passes through to the IOC unaffected.) In response, the IOC 106 raises a control line which is detected by the control receiver 252 and the sequence control logic unit 232 is signalled accordingly. The sequence control logic unit 232, in turn, raises a control line causing a signal to be applied by the control driver 248 to the IOC 106. The IOC 106 then lowers the control line previously raised and makes available data on line 210 including the logical channel number and the first CCE of the channel program. The sequence control logic unit 232 enables the gate 208 so that the data on the line 210 is passed to the PSI register 204 and then enables the gate 224 causing the data to be applied via the translator logic 216 to the microprocessor 126. The sequence control logic unit 232 clears the command store 240 and resets the busy store 244 to allow receipt of the next command by the command store 240 via the gate 236.

After the microprocessor 126 performs certain operations, an Initiate Data Transfer service code is applied to the PSI register 204 and a command is applied via the gate 236 to the command store 240. In a manner similar to that described above, this service code is applied to the IOC 106 after which the IOC 106 applies a Function Mask (which includes, among other things, an identification code word specifying either that no translator is required for the data transfer or that a particular translator is required) via the PSI register 204 to the microprocessor 126. After certain operations are performed, the microprocessor 126 receives from the IOC 106 a Write command in response to which it applies an Initiate Data Transfer service code to the IOC 106 and the identification word via lines 214 to the translator logic 216. If the identification code word indicates that a translator is required, application of the code word to the translator logic 216 initiates a polling operation by the unit 216 to identify and enable the specified translator.

Control signals are then exchanged between the IOC 106 and the sequence control logic unit 232 and the data is transferred by the IOC 106 to the PSI register 204 and then via the translator logic 216 and the gate 224 to the microprocessor 126. If a translator has been enabled, application of the data to the translator logic 216 results in the translation of the data for application to the gate 224 and to the microprocessor 126. If no translator has been enabled, the data is simply applied through the translator logic 216 unchanged to the gate 224.

A Read operation is carried out in a similar fashion except that the data is applied by the microprocessor 126 to the PSI register 204 and then to the translator logic 216 and the gate 220 to the IOC 106.

If the identification code word applied to the translator logic 216 identifies a translator which is not installed, a signal indication of this is made to the microprocessor 126 via line 218. The microprocessor 126 then causes abortion of the channel program. After completion of a data transfer, the translator logic 216 is reset by the microprocessor 126 in preparation for receipt of other channel program commands or issuance of service codes.

Figure 3:
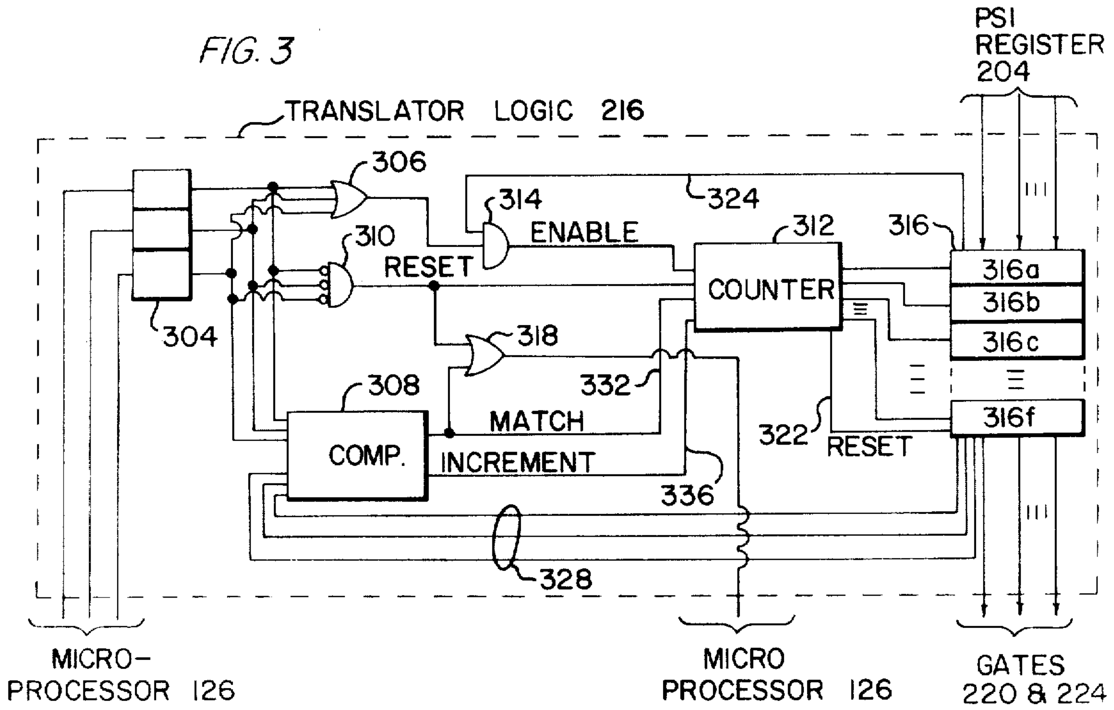
FIG. 3 shows one illustrative embodiment of the translator logic unit of FIG. 2 made in accordance with the principles of the present invention.

The translator logic 216 of FIG. 2 is shown in detail in FIG. 3 and includes an array of translators 316 each of which may be selectively enabled to translate data received from the PSI register 204. Each translator has stored therein a distinctive translator code word for identifying that translator. Also included in the translator logic 216 is a register 304 for receiving from the microprocessor 126 and registering an identification code word. A counter 312 is coupled to the array of translators 316 for successively enabling each translator to cause it to apply its translator code word to a comparator 308.

Operation of the translator logic of FIG. 3 is initiated by the application of an identification code word to the register 304. The register 304 is shown having three register positions to register a 3 bit code word. With a 3 bit identification code, up to seven translators could be identified with one combination of the code being reserved for indicating that no translator is required. Of course, if more than seven translators were to be provided, then a larger identification code would be required and a correspondingly larger register 304 would be required.

The identification code word containing all zeros is reserved to indicate that no translator is required. If such identification code word is applied to the register 304, it causes enablement of a NOT-AND gate 310 which applies a signal to the counter 312 resetting the counter (if it had not previously been reset). The signal from the NOT-AND gate 310 is also applied to an OR gate 318 which signals the microprocessor 126. The signal applied to the microprocessor, as will become clear later, indicates either that no translator is required or that the translator specified by the identification code has been enabled.

When the counter 312 is in the reset condition, it applies a signal via lead 322 to the translator array 316 enabling passage of data applied by the PSI register 204 through the translator array 316 unchanged to the gates 220 and 224 of FIG. 2. Thus, whenever the counter 312 is in the reset condition, any data applied by the PSI register 204 will simply pass through the translator array 316 and not be translated.

All identification code words which identify a particular translator will include at least one binary one therein. Thus, upon application of such an identification code word by the microprocessor 126 to the register 304, an OR gate 306 will be enabled (by the binary one) to apply a signal to an AND gate 314. Lead 324 from the translator array 316 to the AND gate 314 is made high whenever the translator array 316 is powered up. Thus, if the translator array 316 is powered up when the OR gate 306 applies a signal to the AND gate 314, the AND gate will apply an enabling signal to the counter 312. This enabling signal causes the counter 312 to increment its count by one (from whatever count persists in the reset condition). With this first incrementation, the counter 312 applies an enabling signal to a first translator **316*a* of the translator array 316. In response, the translator 316*a* applies its translator code word via lines 328 to the comparator 308. The contents of the register 304 are also being supplied to the comparator 308 at this time and the comparator compares the identification code word from the register 304 with the translator code word of the first translator 316*a*. If the two code words match, the comparator 308 applies a signal via lead 332 to the counter 312 to prevent further incrementation of the counter. The counter thus maintains application of an enabling signal to the translator 316*a* and in response to this signal, the translator will translate any data applied thereto by the PSI register 204. The signal applied to lead 332 by the comparator 308 is also applied to the OR gate 318 which then applies a signal to the microprocessor 126 indicating that the microprocessor may continue the data transfer operations. Thus, if either no translator is required or a translator is enabled, the microprocessor 126** is signalled to continue its operations.

If the identification code word and the translator code word from translator **316*a* do not match, the comparator 308 applies a signal via lead 336 causing the counter to again increment its count by one. The counter 312, in response, applies an enabling signal to the next translator 316*b* of the translator array. The translator 316*b* then applies its translator code word to the comparator 308 for comparison with the identification code word stored in the register 304. The comparison of successive ones of the translator code words with the identification code word continues until the translator identified by the identification code word is enabled. After the desired translator is enabled, any data applied from the PSI register 204 to the translator array 316 will be translated by that translator (from one code to a different code depending upon the capabilities of the translator) for application to gates 220 and 224**.

If none of the translators are enabled because the identification code word does not match any of the translator code words, the counter 312 is incremented to a condition in which no enabling signal is applied to any of the translators and no signal is applied to lead 322. In this condition, no signal is applied by the OR gate 318 to the microprocessor 126 since neither a match occurred nor a reset signal was generated by the NOT-AND gate 310. The microprocessor 126 would sample the output of the OR gate 318, determine that the translator identified by the identification code is not available, and abort the channel program. Normally, upon completion of a data transfer, the microprocessor 126 applies an all-zero code word to the register 304 to cause the counter 312 to reset. This is necessary to prevent translation of commands or service codes which may subsequently be applied to the translator array 316.

Figure 4:
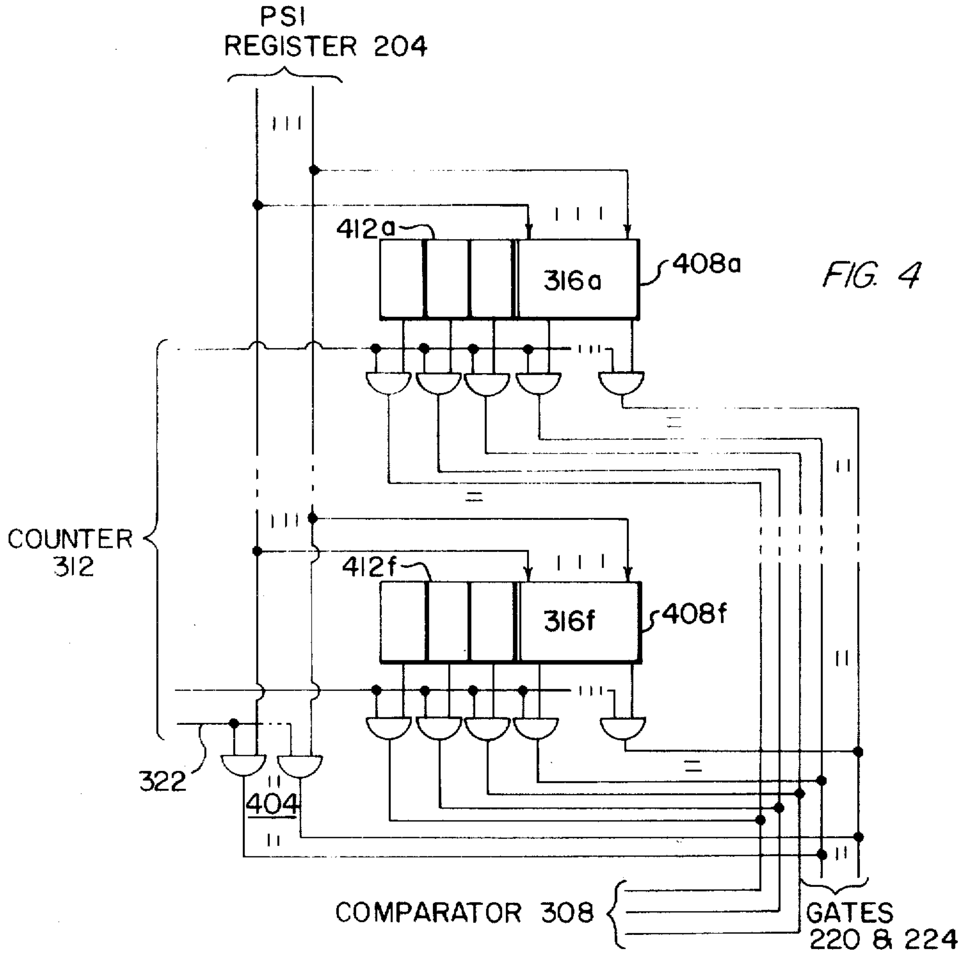
FIG. 4 shows illustrative detailed circuitry of the translator array of FIG. 3.

One illustrative embodiment of the translator array 316 is shown in FIG. 4. Each translator in the array consists of a three bit store 412 for storing the translator code word identifying the translator and translator circuitry 408 for translating data received from the PSI register 204. The outputs from the translator code word storage area 412 and from the translator circuitry 408 are applied to a corresponding array of AND gates. Enabling signals are applied by the counter 312 to successive ones of the AND gate arrays to enable passage therethrough of the translator's storage area 412 and of translated data from the corresponding translator circuitry 408. The translator code words are applied to the comparator 308 and the data is applied to the gates 220 and 224 of FIG. 2. Of course, since only one of the AND gate arrays is enabled at a time, the output of only one of the translators is made available at a time to the comparator 308 and gates 220 and 224. When the counter 312 is in the reset condition, a signal is maintained on line 322 to enable the AND gate array 404 so that any data supplied by the PSI register 204 is simply passed directly to the gates 220 and 224 bypassing all of the translators.

The translator circuitry 408 of each translator, of course, is designed to translate data received thereby from one particular code to some other code. Such translators are well known in the art. Although the AND gates associated with the translator circuitry 408 of each translator are shown at the outputs of the translator circuitry, it is apparent that such AND gates could be positioned at the input of such translator circuitry to obtain the same result.

In the manner shown and described, the present invention enables a peripheral control unit to automatically determine if a desired data translator is available in the peripheral control unit, and if it is, to enable such translator. Because each translator contains its own means of identifying itself, namely the translator code word, translators can be easily added (e.g., by card plug in) to the peripheral control unit without requiring any logic change in the unit to identify and select the added translators. The added translators are simply polled along with the other translators and then enabled if the translator code word matches the identification code word.

It should be understood that the embodiments described herein are only illustrative of the principles of the present invention. Numerous modifications and changes could be made without departing from the spirit and scope of the invention. The appended claims are intended to cover all such modifications and changes.

I claim:

1. In a data processing system which includes a central processing unit and at least one peripheral device, a peripheral control unit for transferring encoded data between the central processing unit and the peripheral device and including a plurality of translators, each responsive to an enabling signal for translating encoded data applied thereto from one code to another and each including means for storing a translator code word which identifies and distinguishes said each translator from the other translators, output lines, and means responsive to said enabling signal for applying the translator code word stored in said each translator to the translator output lines, means for successively supplying identification code words, at least some of which correspond to the translator code words, means for storing said identification code words, means for applying said enabling signal to successive ones of said translators, and means for comparing the identification code word stored in said storing means with each translator code word applied to the output lines, for causing said enabling signal applying means to apply said enabling signal to a next successive one of said translators upon the occurrence of a mismatch, and for causing the enabling signal applying means to maintain application of said enabling signal to a selected translator when the translator code word of the selected translator matches the identification code word stored in the register.

2. Apparatus as in claim 1 wherein said peripheral control unit further includes first logic means responsive to the storage in said storing means of an identification code word corresponding to any one of said translator code words for causing said enabling signal applying means to commence applying said enabling signal to successive ones of said translators.

3. Apparatus as in claim 2 wherein said first logic means is adapted to respond to the storage in said storing means of an identification code word which contains at least one binary one.

4. Apparatus as in claim 2 wherein said peripheral control unit further includes second logic means responsive to the storage in said storing means of a predetermined identification code word for causing said enabling signal applying means to reset and terminate application of said enabling signal to said translators.

5. Apparatus as in claim 4 wherein said second logic means is adapted to respond to the storage of a predetermined identification code word which includes all binary zeros therein.

6. Apparatus as in claim 4 wherein said enabling signal applying means includes means for supplying a reset signal when in the reset condition, and wherein said peripheral control unit includes means responsive to said reset signal for causing data applied to the translators to bypass the translators.

7. Apparatus as in claim 4 wherein said peripheral control unit further includes means for applying a status indicating signal to said indentification code word supplying means upon the occurrence of a match between a translator code word and the identification code word stored in said storing means or upon the storage in said storing means of said predetermined identification code word.

8. Apparatus as in claim 4 wherein said enabling signal applying means comprises a counter having a plurality of output leads, each coupled to a different one of said translators, said counter being adapted to apply an enabling signal to successive ones of said output leads.

9. In a data processing system in which encoded data is transferred from one location in the system to another location, apparatus including a plurality of translators, each for translating said encoded data from one code to a different code, means for storing an identification code word for identifying a selected one of said translators, means for sequentially comparing the identification code word stored in said storing means with each of a plurality of translator code words, each of which is associated with and identifies a different one of said translators, and means responsive to the comparing means for enabling operation of a translator identified by the translator code word which matches the identification code word.

10. Apparatus as in claim 9 wherein each of said translators includes means for storing the translator code word which identifies the translator, and wherein said enabling means comprises means for successively causing each of said translators to apply its translator code word to said comparing means for comparison with the identification code word stored in said storing means.

11. A peripheral control unit for use in a data processing system in which encoded data is applied to the peripheral control unit for application to one or more peripheral devices and in which the peripheral control unit retrieves encoded data from the peripheral devices for transfer to a central processing unit including a plurality of translators, each for translating encoded data received thereby from one code to another code and each including means for storing a translator code word for identifying and distinguishing said each translator from the other translators, first and second groups of output lines, and logic means responsive to an enabling signal for applying the translator code word stored in said each translator to said first group of output lines and for applying data recieved and translated by said each translator to said second group of output lines, means responsive to a first signal for applying said enabling signal to the logic means of a first one of said translators, responsive to receipt of successive second signals for applying said enabling signal to the logic means of successive ones of the other translators, and responsive to a third signal for maintaining application of said enabling signal to the logic means of a selected one of said translators, storing means for storing a code word supplied by the central processing unit, means for applying said first signal to said enabling signal applying means when the code word stored in said storing means corresponds to any one of the translator code words, and means for comparing the code word stored in said storing means with each translator code word applied to said first group of output lines and for applying said second signal to said enabling signal applying means upon the occurrence of a mismatch and for applying said third signal to said enabling signal applying means upon the occurrence of a match.

12. The peripheral control unit of claim 11 further including means responsive to the storage of a predetermined code in said storing means for causing said enabling signal applying means to reset and terminate application of enabling signals to the logic means of said translators.

13. The peripheral control unit of claim 12 wherein said enabling signal applying means comprises a counter having a plurality of output leads, each coupled to a different one of the logic means of said translators, said counter being adapted to increment its count each time a second signal is received to thereby apply an enabling signal to the next successive one of the output leads.

14. The peripheral control unit of claim 13 further including a set of input lines coupled to each of said translators for applying data thereto, a set of output lines coupled to each of said second groups of output lines, and means for applying data from said set of input lines to said set of output lines when the counter is in the reset condition.

15. In a data processing system comprising a central processing unit for issuing commands, one or more peripheral devices for storing data, and a peripheral control unit for transferring encoded data between the central processing unit and the peripheral device in response to commands from the central processing unit, a method for automatically selecting and enabling one of a plurality of translators included in said peripheral control unit to translate encoded data from one code to another comprising the steps of a. the central processing unit supplying to the peripheral control unit a command which includes an identification code word,
b. storing the identification code word in a register,
c. comparing the identification code word stored in the register with a translator code word stored in a first one of the translators,
d. comparing the identification code word stored in the register with a translator code word stored in a next successive one of the translators upon the occurrence of a mismatch in the previous comparison,
e. repeating step (d) until a match occurs, and
f. enabling the translator whose translator code word matches the identification code word stored in the register, and
g. supplying encoded data to the enabled translator for translation of the data.

* * * * *